(12) United States Patent
Kagata et al.

(10) Patent No.: US 10,487,227 B2
(45) Date of Patent: Nov. 26, 2019

(54) INK SET AND RECORDING METHOD

(71) Applicant: Seiko Epson Corporation, Tokyo (JP)

(72) Inventors: Takayoshi Kagata, Shiojiri (JP);
Hiroshi Fukumoto, Shiojiri (JP);
Takeshi Yano, Shiojiri (JP); Miho Nakamura, Matsumoto (JP); Shugo Hattori, Shiojiri (JP); Katsuko Aoki, Kiso-Machi (JP); Shigeki Kawada, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/142,019

(22) Filed: Sep. 26, 2018

(65) Prior Publication Data
US 2019/0092953 A1  Mar. 28, 2019

(30) Foreign Application Priority Data

Sep. 28, 2017  (JP) .................. 2017-188510

(51) Int. Cl.
| B41M 5/382 | (2006.01) |
| C09D 11/037 | (2014.01) |
| C09D 11/102 | (2014.01) |
| C09D 11/107 | (2014.01) |
| C09D 11/108 | (2014.01) |
| C09D 11/106 | (2014.01) |
| C09D 11/326 | (2014.01) |
| C09D 11/328 | (2014.01) |

(Continued)

(52) U.S. Cl.
CPC .......... C09D 11/108 (2013.01); B41M 5/0256 (2013.01); B41M 5/0356 (2013.01); B41M 5/38235 (2013.01); C09D 11/037 (2013.01); *C09D 11/102* (2013.01); *C09D 11/106* (2013.01); *C09D 11/107* (2013.01); *C09D 11/326* (2013.01); *C09D 11/328* (2013.01); *C09D 11/38* (2013.01); *C09D 11/40* (2013.01)

(58) Field of Classification Search
CPC .............. B41M 5/0256; B41M 5/0356; B41M 5/38253; C09D 11/037; C09D 11/102; C09D 11/106; C09D 11/107; C09D 11/108; C09D 11/326; C09D 11/328; C09D 11/38; C09D 11/40
See application file for complete search history.

(56) References Cited

U.S. PATENT DOCUMENTS

| 2015/0337153 A1* | 11/2015 | Oguchi | .................... C08K 5/08 428/195.1 |
| 2016/0177099 A1* | 6/2016 | Shimizu | .............. C09B 67/0033 430/17 |
| 2016/0208435 A1* | 7/2016 | Oguchi | ................. D06P 1/0096 |

FOREIGN PATENT DOCUMENTS

| JP | 2013-159659 A | 8/2013 |
| JP | 2016-132756 A | 7/2016 |
| JP | 2016-190937 A | 11/2016 |

* cited by examiner

Primary Examiner — Anh T Vo
(74) Attorney, Agent, or Firm — Harness, Dickey & Pierce, P.L.C.

(57) ABSTRACT

An ink set which is used for sublimation transfer includes a first ink, and a second ink. The first ink has a color after transfer of |a*|≤10 and |b*|≤10 in a CIELAB color space, and contains a first disperse dye dispersed by a first dispersion resin. The second ink has a color after transfer of |a*|>10 or |b*|>10 in the CIELAB color space, and contains a second disperse dye dispersed by a second dispersion resin. A glass transition temperature of the first dispersion resin and is different than that of the second dispersion resin.

20 Claims, 1 Drawing Sheet

(51) Int. Cl.
*C09D 11/38* (2014.01)
*C09D 11/40* (2014.01)
*B41M 5/025* (2006.01)
*B41M 5/035* (2006.01)

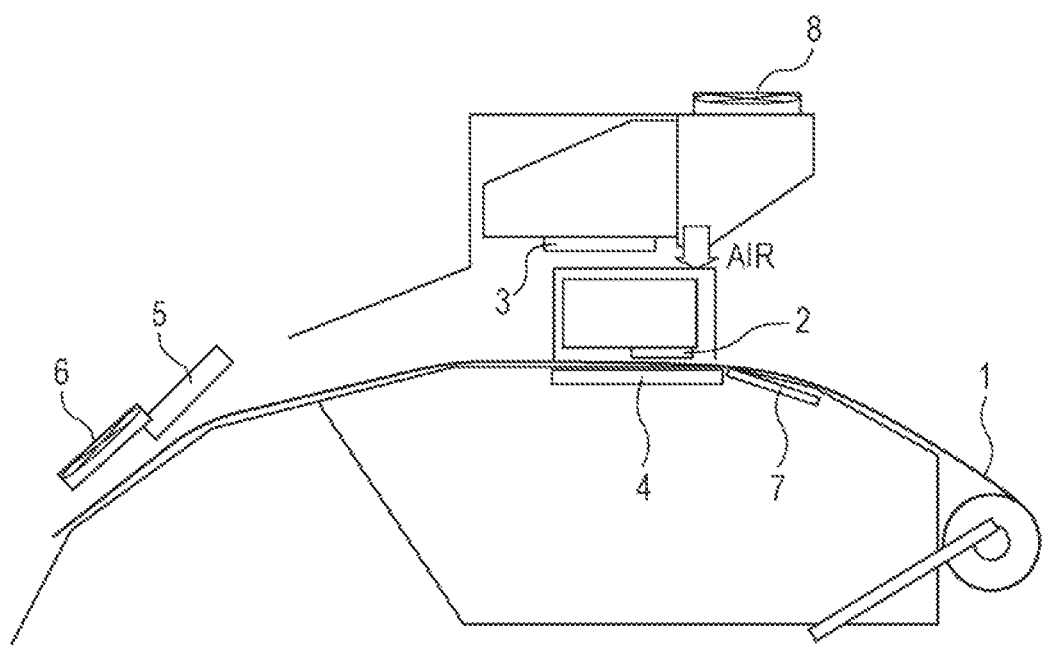

INK SET AND RECORDING METHOD

BACKGROUND

1. Technical Field

The present invention relates to an ink set and a recording method.

2. Related Art

An ink jet recording method is a method in which small droplets of ink are discharged from fine nozzles and caused to adhere to a recording medium to perform recording. In the method, an image having high resolution and high quality can be recorded at a high speed with a relatively inexpensive apparatus. In the ink jet recording method, there are a considerably large number of factors to be studied, including properties of the ink to be used, stability in recording, quality of an image to be obtained, and studies on not only the ink jet recording apparatus but also the ink composition to be used are actively conducted.

In addition, there are also fabrics and the like that are dyed (printed) by the ink jet recording method. As a printing method for fabrics (woven fabrics or non-woven fabrics), a screen printing method, a roller printing method, and the like have been used. However, since it is advantageous that an ink jet recording method is applied from a viewpoint of multi-kind and small-quantity production, immediate printability, and the like, various studies continue to be conducted.

For example, JP-A-2016-132756 discloses an ink set containing a dye dispersed by a naphthalenesulfonic acid.

As one mode of the printing, there is a transfer type printing method using a sublimation type dye. In the printing method, an ink composition is not directly adhered to a printing object medium (such as fabric), but an ink composition is adhered to a transfer medium (such as transfer paper) serving as a transfer source, and thereafter, a dye is transferred from the transfer medium to the printing object medium to dye the printing object medium.

In the printing method using a transfer technique, a dye having sublimability is mixed with an ink composition to adhere firstly to the medium as the transfer source. Thereafter, a sublimation dye is sublimated by steam or heat to dye the printing object medium (such as fabric), which is a dry (gas phase) dyeing method. Therefore, penetration or bleeding of the ink composition in the medium as the transfer source affects the image quality obtained in the final printing object medium. Thus, the physical properties required for the ink composition used in a sublimation transfer method are different from the physical properties required for printing on the fabric by a directly attaching technique.

In addition, as in the ink described in JP-A-2016-132756, when a disperse dye is dispersed by naphthalenesulfonic acid, in a case where heat is applied in a sublimation transfer step, odor as an aromatic compound may occur.

SUMMARY

An advantage of some aspects of the invention is to provide an ink set for sublimation transfer which is excellent in storage stability and re-dispersibility, and prevents odor and bleeding of an image to be formed from occurring, and a recording method using the same.

The invention can be realized as the following aspects or application examples.

According to an aspect of the invention, an ink set which is used for sublimation transfer includes a first ink, and a second ink, in which the first ink has a color after transfer of $|a^*|\leq 10$ and $|b^*|\leq 10$ in a CIELAB color space, the first ink contains a first disperse dye dispersed by a first dispersion resin, the second ink has a color after transfer of $|a^*|>10$ or $|b^*|>10$ in the CIELAB color space, the second ink contains a second disperse dye dispersed by a second dispersion resin, and a glass transition temperature Tg of the first dispersion resin and a glass transition temperature Tg of the second dispersion resin are different from each other.

According to this ink set, storage stability and re-dispersibility are excellent, and odor and bleeding of an image to be formed are prevented from occurring. That is, when the disperse dye is dispersed by the first dispersion resin and the second dispersion resin, the storage stability and the re-dispersibility are favorable and odor during heating can be prevented from occurring. Thus, when the first dispersion resin and the second dispersion resin respectively have different Tg, the behavior of the first ink and the second ink when being solidified can be controlled. Therefore, even in a case where both the first ink and the second ink are disposed close to each other on the recording medium, the inks are prevented from being mixed with each other (bleeding) and an image in which bleeding is prevented from occurring can be formed.

In the ink set, the glass transition temperature Tg of the first dispersion resin may be higher than the glass transition temperature Tg of the second dispersion resin.

According to this ink set, since the glass transition temperature Tg of the first dispersion resin contained in the first ink which has a color close to an achromatic color is high, even in a case where both inks are disposed close to each other on the recording medium, it is difficult for the first disperse dye to penetrate from a first ink side to a second ink side. Accordingly, it is possible to further prevent the bleeding of the image from occurring.

In the ink set, the glass transition temperature Tg of the first dispersion resin may be higher than the glass transition temperature Tg of the second dispersion resin by 20° C. or more.

According to this ink set, since the glass transition temperature Tg of the first dispersion resin contained in the first ink which has a color close to an achromatic color is sufficiently high, even in a case where both inks are disposed close to each other on the recording medium, it is difficult for the first disperse dye to penetrate from a first ink side to a second ink side. Accordingly, it is possible to further prevent the bleeding of the image from occurring.

In the ink set, the first dispersion resin and the second dispersion resin may each independently be one or more selected from acrylic resin, styrene resin, and urethane resin.

According to this ink set, disperse dyes can be more favorably dispersed, respectively.

In the ink set, the first dispersion resin and the second dispersion resin may each independently be one or more selected from styrene resin and urethane resin.

According to this ink set, disperse dyes can be more favorably dispersed, respectively.

In the ink set, both of the first dispersion resin and the second dispersion resin may have an aromatic ring structure.

According to this ink set, even in a case where each of the first disperse dye and the second disperse dye has a structure that is easy to stack, it is still possible to prevent stacking from occurring. Accordingly, foreign matters can be prevented from occurring to further improve the storage stability and the re-dispersibility. Accordingly, it is also possible to improve discharge stability.

In the ink set, the second ink may contain, as the second disperse dye, one or more selected from C.I. disperse blue 60, C.I. disperse blue 87, C.I. disperse blue 165, C.I. disperse blue 359, C.I. disperse violet 28, C.I. solvent violet 13, C.I. disperse red 60, C.I. disperse red 154, C.I. disperse red 191, C.I. disperse red 277, C.I. disperse red 362, C.I. disperse red 364, C.I. solvent red 242, C.I. disperse orange 25, C.I. solvent orange 60, C.I. disperse yellow 54, C.I. disperse yellow 71, C.I. disperse yellow 82, C.I. disperse yellow 114, C.I. disperse yellow 163, C.I. disperse yellow 184, C.I. disperse yellow 232, C.I. solvent yellow 82, and C.I. solvent yellow 145.

According to this ink set, it is possible to achieve a wider color reproduction range (gamut).

In the ink set, the first ink may contain C.I. disperse blue 360 as the first disperse dye.

According to this ink set, it is possible to further improve a density (for example, black density) of an image in the recording medium. Therefore, for example, it is possible to reduce the amount of the first ink to be used.

In the ink set, one or both of the first ink and the second ink may further contain glycol ether.

According to this ink set, the re-dispersibility is further excellent.

According to another aspect of the invention, a recording method using an ink set which is used for sublimation transfer and includes: a first ink and a second ink includes attaching the first ink and the second ink to transfer paper by an ink jet method; and heating the transfer paper, after the attaching, in which the first ink has a color after transfer of $|a^*|\le 10$ and $|b^*|\le 10$ in a CIELAB color space, the first ink contains a first disperse dye dispersed by a first dispersion resin, the second ink has a color after transfer of $|a^*|>10$ or $|b^*|>10$ in the CIELAB color space, the second ink contains a second disperse dye dispersed by a second dispersion resin, and a glass transition temperature Tg of the first dispersion resin and a glass transition temperature Tg of the second dispersion resin are different from each other.

According to this recording method, it is possible to perform odor reduced recording and it is possible to form an image, in which bleeding is prevented from occurring, on the transfer paper. That is, in the heating, it is possible to prevent odor during heating from occurring. When the first dispersion resin and the second dispersion resin respectively have different glass transition temperatures Tg, the first ink and the second ink are difficult to become mixed with each other. Therefore, even in a case where both the first ink and the second ink are disposed close to each other on the transfer paper, the inks are prevented from being mixed with each other (bleeding) and an image in which bleeding is prevented from occurring can be formed.

In the recording method, the method may further include heating the transfer paper and a recording medium by being faced to each other, and the recording medium may contain polyester.

According to this recording method, it is possible to perform odor reduced recording and it is possible to form an image, in which bleeding is prevented from occurring, on the recording medium. In addition, when the recording medium contains polyester, it is possible to perform recording in which a dyeing property and a coloring property are further favorable.

BRIEF DESCRIPTION OF THE DRAWING

Embodiments of the invention will be described with reference to the accompanying drawing, wherein like numbers reference like elements.

The FIGURE is a schematic diagram showing an outline of an ink jet recording apparatus according to an embodiment.

DESCRIPTION OF EXEMPLARY EMBODIMENTS

Hereinafter, embodiments of the invention will be described. The embodiments described below illustrate examples of the invention. The invention is not limited to the following embodiments at all and also includes various modifications which are carried out within a range without changing the gist of the invention. Not all of the configurations described below are necessarily indispensable to the invention.

1. INK SET

An ink set according to the present embodiment contains a first ink having a color after transfer of $|a^*|\le 10$ and $|b^*|\le 10$ in a CIELAB color space and a second ink having a color after transfer of $|a^*|>10$ or $|b^*|>10$ in the CIELAB color space. The ink set of the present embodiment is suitably used for applications of performing recording on a recording medium by sublimation transfer.

1.1. First Ink

The first ink included in the ink set according to the present embodiment develops a color of $|a^*|\le 10$ and $|b^*|\le 10$ in the CIELAB color space when it has dyed the recording medium (after transfer). For example, 10 g/m² of printing is performed on the transfer paper with the first ink and the printed matter is transferred to a white recording medium. As a result, the first ink develops a color of $|a^*|\le 10$ and $|b^*|\le 10$ in the CIELAB color space.

In the present specification, the color of $|a^*|\le 10$ and $|b^*|\le 10$ in the CIELAB color space may be referred to as a "low chroma color". In addition, in a case where the recording medium is dyed, an ink developing a color of $|a^*|\le 10$ or $|b^*|\le 10$ in the CIELAB color space may be referred to as a "low chroma color ink".

1.1.1. First Disperse Dye

The first ink of the present embodiment contains the first disperse dye. The first disperse dye is dispersed by the first dispersion resin to be described later. The first disperse dye is a dye suitably used for dyeing hydrophobic synthetic fibers formed of polyester, nylon, acetate, and the like, and is a compound that is insoluble or hardly soluble in water. In addition, the first disperse dye is a dye having a property of sublimation by heating. Specific examples of the first disperse dye used in the first ink of the present embodiment are as follows. The following examples include dyes classified as a solvent dye. However, in the present specification, an oil-soluble dye which does not have water solubility and is in a dispersed form in water is considered as a type of the disperse dye.

As the first disperse dye, a so-called composite containing plural kinds of disperse dyes may be used in a range capable of dyeing the recording medium to a color close to an achromatic color (low chroma color) with the first ink. That is, the disperse dye may be used alone, or two or more kinds thereof may be used in combination (composite), for the purpose of obtaining a predetermined color tone or the like. For example, in a case where first ink is prepared to be a black ink, a blue dye is mainly used and an orange dye, a red dye, and a yellow dye are appropriately mixed to adjust the color to black, and a mixture of such dyes can be used as the first disperse dye. In addition, a plurality of dyes may be mixed to finely adjust the low chroma color tone to a color tone of, for example, weak blue, orange, red, violet, or black.

Yellow Dye

Examples of the yellow dye include C.I. disperse yellow 3, 4, 5, 7, 9, 13, 23, 24, 30, 33, 34, 39, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 200, 202, 204, 210, 211, 215, 216, 218, 224, 227, 231, 232, and 237. Among these, the C.I. disperse yellow 54 is preferable. The coloring property of the dyed material may be further improved by using these yellow dyes, in some cases.

Magenta Dye

Examples of the magenta dye include C.I. disperse red 1, 4, 5, 7, 11, 12, 13, 15, 17, 27, 43, 44, 50, 52, 53, 54, 55, 55:1, 56, 58, 59, 60, 65, 70, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 158, 159, 164, 167, 169, 177, 179, 181, 183, 184, 185, 188, 189, 190, 190:1, 191, 192, 200, 201, 202, 203, 205, 206, 207, 210, 221, 224, 225, 227, 229, 239, 240, 257, 258, 266, 277, 278, 279, 281, 283, 288, 298, 302, 303, 310, 311, 312, 320, 323, 324, 328, and 359.

Cyan Dye

Examples of the cyan dye include C.I. disperse blue 3, 5, 7, 9, 14, 16, 19, 20, 26, 26:1, 27, 35, 43, 44, 54, 55, 56, 58, 60, 62, 64, 64:1, 71, 72, 72:1, 73, 75, 77, 79, 79:1, 81, 81:1, 82, 83, 87, 91, 93, 94, 95, 64:1, 96, 102, 106, 108, 112, 113, 115, 118, 120, 122, 125, 128, 130, 131, 139, 141, 142, 143, 145, 146, 148, 149, 153, 154, 158, 165, 165:1, 165:2, 167, 171, 173, 174, 176, 181, 183, 185, 186, 187, 189, 197, 198, 200, 201, 205, 207, 211, 214, 224, 225, 257, 259, 266, 267, 270, 281, 284, 285, 287, 288, 291, 293, 295, 297, 301, 315, 330, 333, 341, 353, 354, 358, 359, 360, 364, 365, and 368. Among these, the C.I. disperse blue 14, 359, and 360 are preferable and the C.I. disperse blue 360 is more preferable. The coloring property of the dyed material may be further improved by using these cyan dyes, in some cases.

Orange Dye

Examples of the orange dye include C.I. disperse orange 1, 1:1, 3, 5, 7, 11, 13, 17, 20, 21, 23, 25, 25:1, 29, 30, 31, 32, 33, 37, 38, 42, 43, 44, 45, 47, 48, 49, 50, 53, 54, 55, 56, 57, 58, 59, 61, 66, 71, 73, 76, 78, 80, 86, 89, 90, 91, 93, 96, 97, 118, 119, 127, 130, 139, and 142. Among these, the C.I. disperse orange 25 is preferable. The coloring property of the dyed material may be further improved by using these orange dyes, in some cases.

Brown Dye

Examples of the brown dye include C.I. disperse brown 1, 2, 4, 9, 13, 19, and 27.

Violet Dye

Examples of the violet dye include C.I. disperse violet 1, 4, 8, 11, 17, 23, 26, 27, 28, 29, 31, 33, 35, 36, 38, 40, 43, 46, 48, 50, 51, 52, 56, 57, 59, 61, 63, 69, 77, and 97.

Green Dye

Examples of the green dye include C.I. disperse green 9.

Black Dye

Examples of the black dye include C.I. disperse black 1, 3, 4, 5, 6, 7, 8, 9, 10, 11, 12, 13, 14, 15, 20, 22, 24, 25, 26, 27, 28, 29, 29:1, 30, 31, 32, 33, 34, and 36, and C.I. solvent black 3, 5, 5:2, 7, 13, 22, 22:1, 26, 27, 28, 29, 34, 35, 43, 45, 46, 48, 49, and 50.

Oil-Soluble Dye

Examples of the oil-soluble dye respectively include C.I. solvent yellow 114 as the yellow dye; C.I. solvent orange 60 and 67 as the orange dye; C.I. solvent red 146 as the magenta dye; and C.I. solvent blue 36, 63, 83, 105, and 111 as the cyan dye.

As the first disperse dye, it is possible to use a single dye or plural kinds of dyes (composite) selected from the dyes exemplified above, within a range capable of developing low chroma color when used as the first ink. In addition, it is more preferable for the first disperse dye to employ two or more kinds selected from the yellow dye, the magenta dye, the cyan dye, the orange dye, and the brown dye, among the dyes exemplified above.

In addition, it is more preferable that the first disperse dye include the C.I. disperse blue 360, as a component of the composite. When the first disperse dye includes the C.I. disperse blue 360, it is possible to further improve a density (for example, black density) of the low chroma color in the recording medium and the amount of the first ink to be used may be reduced in some cases.

A total content of the first disperse dye is 3% by mass or more and 7% by mass or less, preferably 3.5% by mass or more and 6.5% by mass or less, and more preferably approximately 4% by mass or more and 6% by mass or less, with respect to a total amount of the first ink. In addition, in a case where the C.I. disperse blue 360 is contained in the first disperse dye, a total content of the C.I. disperse blue 360 is preferably 1% by mass or more and 4% by mass or less, more preferably 1.5% by mass or more and 3.5% by mass or less, and further preferably 1.5% by mass or more and 2.5% by mass or less, with respect to the total amount of the first ink.

When the content of the first disperse dye is 3% by mass or more, the coloring property (an OD value) of the obtained dyed material (transfer destination) is sufficient. In addition, when the content of the first disperse dye is 7% by mass or less, the discharge stability tends to be favorable when discharging the first ink by the ink jet head.

The average particle diameter of the first disperse dye is 30 nm or more and 300 nm or less, preferably 50 nm or more and 250 nm or less, and more preferably 50 nm or more and 200 nm or less. When the average particle diameter is within this range, sublimation efficiency is improved and a more favorable coloring property is obtained.

All the dyes exemplified above are compounds that are insoluble or hardly soluble in water, but as long as the dyes have a concentration within a specific range, the dyes can be favorably dispersed in water by the dispersion resin to be described later. In addition, the dyes exemplified above are slightly different in dispersibility or solubility from one another. That is, depending on the kind of dye used, a preferable kind or concentration range of the dispersion resin may be different in some cases.

1.1.2. First Dispersion Resin

The first ink of the present embodiment contains the first dispersion resin as a dispersant of the first disperse dye. The first dispersion resin has a function of dispersing (or emulsifying) the above-described first disperse dye in the first ink. The first dispersion resin is not particularly limited, and examples thereof can include the following.

Examples of the dispersion resin include (meth)acrylic resin such as poly (meth)acrylic acid, (meth)acrylic acid-acrylonitrile copolymer, (meth)acrylic acid-(meth)acrylic acid ester copolymer, vinyl acetate-(meth)acrylic acid ester copolymer, vinyl acetate-(meth)acrylic acid copolymer, and vinyl naphthalene-(meth)acrylic acid copolymer, and salts thereof; styrene resin such as styrene-(meth)acrylic acid copolymer, styrene-(meth)acrylic acid copolymer, styrene-(meth)acrylic acid-(meth)acrylic acid ester copolymer, styrene-a-methylstyrene-(meth)acrylic acid copolymer, styrene-a-methylstyrene-(meth)acrylic acid-(meth)acrylic acid ester copolymer, styrene-maleic acid copolymer, and styrene-maleic anhydride copolymer and salts thereof; an urethane resin, which is a polymer compound (resin) having an urethane bond in which an isocyanate group and a hydroxyl group are reacted and may be linear and/or branched regardless of a cross-linked structure, and salts thereof; polyvinyl alcohols; a polyvinyl pyrrolidones; vinylnaphthalene-maleic acid copolymer and salts thereof; a vinyl acetate-maleic acid ester copolymer and salts thereof; and a vinyl acetate-crotonic acid copolymer and salts thereof.

Among commercially available dispersion resins, examples of the styrene based dispersion resins include X-200, X-1, X-205, X-220, and X-228 (which are manufactured by SEIKO PMC CORPORATION), Nopcosperse 6100 and 6110 (which are manufactured by SAN NOPCO LIMITED), Joncryl 67, 586, 611, 678, 680, 682, and 819 (which are manufactured by BASF Corporation), DISPER BYK-190 (manufactured by BYK Japan KK.), and N-EA137, N-EA157, N-EA167, N-EA177, N-EA197D, N-EA207D, and E-EN10 (which are manufactured by DKS Co. Ltd).

In addition, examples of commercially available acrylic resin dispersants include BYK-187, BYK-190, BYK-191, BYK-194N, and BYK-199 (which are manufactured by BYK Additives & Instruments), ARON A-210, A6114, AS-1100, AS-1800, A-30SL, A-7250, and CL-2 (which are manufactured by TOAGOSEI CO., LTD.).

Further, examples of commercially available urethane resin dispersants include BYK-182, BYK-183, BYK-184, and BYK-185 (which are manufactured by BYK Additives & Instruments), TEGO Disperse 710 (manufactured by Evonik Tego Chemie GmbH), and Borchi (registered trademark) Gen 1350 (manufactured by OMG Borschers).

As the first dispersion resin of the first ink, one of the above-described dispersion resins may be used or two or more kinds thereof may be used in combination. A total content of the dispersion resin is 0.1% by mass or more and 20% by mass or less, preferably 0.5% by mass or more and 10% by mass or less, more preferably 1% by mass or more and 8% by mass or less, and further preferably 1.5% by mass or more and 5% by mass or less, with respect to 100% by mass of the first ink. When the content of the dispersion resin is 0.1% by mass or more, it is possible to ensure the dispersion stability of the first disperse dye. In addition, when the content of the dispersion resin is 20% by mass or less, it is possible to lower a viscosity of the first ink within a suitable range.

Further, it is more preferable that the total content of the first dispersion resin be formulated so that a mass ratio of the first dispersion resin to the first disperse dye (Sum of first dispersion resin/Sum of first disperse dye) is 20% or more and 200% or less. In addition, the mass ratio of the dispersion resin to the disperse dye is more preferably 30% or more and 150% or less, further preferably 40% or more and 100% or less, and particularly preferably 40% or more and 60% or less. According to this, the amount of the first dispersion resin with respect to the first disperse dye becomes favorable. Therefore, it is possible to further favorably disperse the first disperse dye.

In addition, it is further preferable that the first dispersion resin be one or more selected from the acrylic resins, the styrene resins, and the urethane resins, among the above-exemplified dispersion resins. When using these dispersion resins as the first dispersion resin, it is possible to obtain the further favorable dispersion stability of the first disperse dye.

Further, it is further preferable that the first dispersion resin be one or more selected from the styrene resins and the urethane resins, among the above-exemplified dispersion resins. When using these dispersion resins as the first dispersion resin, it is possible to obtain the further favorable dispersion stability of the first disperse dye. In this case, it is further preferable that a weight average molecular weight of the dispersion resin be 500 or more. When using these dispersion resins, it is possible to obtain the further favorable dispersion stability of the disperse dye.

Further, it is particularly preferable that the first dispersion resin be one or more selected from the styrene resins, among the above-exemplified dispersion resins. Examples of the styrene resins include a copolymer of various styrene monomers such as styrene and α-methylstyrene and various radical polymerizable monomers. Since the styrene resin contains a site having a planar structure (aromatic ring structure) such as a benzene ring, the styrene resin has an effect to strongly prevent the first disperse dye from stacking. A tabular molecule tends to cause stacking, become unstable and easily become foreign matters. However, for example, when using a dispersion resin having a molecular weight larger than that of a coloring material, there may be a case where it is possible to inhibit the stacking of tabular molecules. In addition, for example, when a dispersion resin having a structure of a styrene based polymer is selected, a stack on the tabular molecule forms a stable structure with a dispersion resin-disperse dye, by interactions of π-π stacking, T-type stacking, and CH-π stacking to stabilize the dispersion in some cases.

Accordingly, even in a case where the first disperse dye has a structure that is easy to stack, it is still possible to prevent stacking from occurring. Accordingly, foreign matters can be prevented from occurring to further improve the storage stability and the re-dispersibility. Accordingly, it is also possible to improve discharge stability.

1.1.3. Other Components 1.1.3.1. Water Soluble Organic Solvent

The first ink of the present embodiment may contain a water soluble organic solvent. When the first ink contains the water soluble organic solvent, a moisture retaining property of first ink can be enhanced, discharge stability by an ink jet method can be excellent, and moisture can be effectively prevented from evaporating from the recording head, even when left for a long time. Accordingly, even in a case of using a kind of dye that is likely to cause clogging of the nozzle, it is possible to maintain recovery performance after leaving or to have favorable discharge stability. Examples of the water soluble organic solvent include alkyl polyol, a nitrogen-containing cyclic compound, and glycol ether.

Examples of the alkyl polyol include 1,2-butanediol (194° C.), 1,2-pentanediol (210° C.), 1,2-hexanediol (224° C.), 1,2-heptanediol (227° C.), 1,3-propanediol (210° C.), 1,3-butanediol (230° C.), 1,4-butanediol (230° C.), 1,5-pentanediol (242° C.), 1,6-hexanediol (250° C.), 2-ethyl-2-methyl-1,3-propanediol (226° C.), 2-methyl-2-propyl-1,3-propanediol (230° C.), 2-methyl-1,3-propanediol (214° C.), 2,2-dimethyl-1,3-propanediol (210° C.), 3-methyl-1,3-butanediol (203° C.), 2-ethyl-1,3-hexanediol (244° C.), 3-methyl-1,5-pentanediol (250° C.), 2-methylpentane-2,4-diol (197° C.), diethylene glycol (245° C.), dipropylene glycol (232° C.), triethylene glycol (287° C.), glycerin (290° C.). The numerical values in parentheses indicate a normal boiling point. One of these alkyl polyols may be used alone or two or more kinds thereof may be used in combination.

In addition, examples of the nitrogen-containing heterocyclic compound include lactams such as ε-caprolactam (136° C.). Examples of the water-soluble organic solvents include lactones such as γ-butyrolactone (204° C.) and a betaine compound. Further, glycol ether may be contained. Accordingly, there may be a case where wettability and penetration rate of the composition can be controlled.

Examples of the glycol ether preferably include monoalkyl ether of glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. Examples of the glycol ether more preferably include methyl triglycol (triethylene glycol monomethyl ether), butyl triglycol (triethylene glycol monobutyl ether), butyl diglycol (diethylene glycol monobutyl ether), and dipropylene glycol monopropyl ether, and representative examples thereof include diethylene glycol monobutyl ether (230° C.). The numerical values in parentheses indicate a normal boiling point.

In a case where either one or both of the first ink and the second ink to be described later further contain glycol ether, due to the moisture retaining property of the glycol ether, the contained disperse dyes are further prevented from agglomerating, it is easy to return to the original dispersed state even when the ink is dried or agglomeration of disperse dyes occurs, and it is possible to obtain further favorable re-dispersibility.

Plural kinds of these water soluble organic solvents may be used in a mixture. In addition, from the viewpoints of viscosity adjustment of first ink and clogging prevention due to moisture retention, a total amount of the water soluble organic solvent is 0.2% by mass or more and 30% by mass or less, preferably 0.4% by mass or more and 20% by mass or less, more preferably 0.5% by mass or more and 15% by mass or less, and further preferably 0.7% by mass or more and 10% by mass or less, with respect to a total amount of the first ink.

1.1.3.2. Surfactant

The first ink of the present embodiment may contain a surfactant. The surfactant can be used to lower a surface tension of the first ink to adjust and improve the wettability with the recording medium (permeability to fabrics). As the surfactant, any of a nonionic surfactant, an anionic surfactant, a cationic surfactant, and an amphoteric surfactant can be used, and these surfactants may be used in combination. In addition, among the surfactants, nonionic surfactants such as acetylene glycol based surfactant, silicone based surfactant, and fluorine based surfactant are more preferable.

The acetylene glycol based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, which are manufactured by Air Products and Chemicals. Inc.), OLFINE B, Y, P, A, STG, SPC, E1004, E1010, PD-001, PD-002W, PD-003, PD-004, PD-005, EXP.4001, EXP.4036, EXP.4051, AF-103, AF-104, AK-02, SK-14, and AE-3 (all trade names, which are manufactured by Nisshin Chemical Industry Co., Ltd.), ACETYLENOL E00, E00P, E40, and E100 (all trade names, which are manufactured by Kawaken Fine Chemicals Co.,Ltd.).

The silicone based surfactant is not particularly limited, and examples thereof preferably include a polysiloxane based compound. The polysiloxane based compound is not particularly limited, and examples thereof include a polyether-modified organosiloxane. Examples of commercially available polyether-modified organosiloxanes include BYK-306, BYK-307, BYK-333, BYK-341, BYK-345, BYK-346, BYK-348, and BYK-349 (all trade names, which are manufactured by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, which are manufactured by Shin-Etsu Chemical Co., Ltd.).

As the fluorine based surfactant, a fluorine-modified polymer is preferably used. Specific examples thereof include BYK-340 (manufactured by BYK Japan KK.).

In a case where the surfactant is mixed with the first ink, a total amount of the surfactant to be mixed in is 0.01% by mass or more and 3% by mass or less, preferably 0.05% by mass or more and 2% by mass or less, further preferably 0.1% by mass or more and 1.5% by mass or less, and particularly preferably 0.2% by mass or more and 1% by mass or less, with respect to total amount of the first ink.

In addition, when the first ink contains a surfactant, stability when the ink is discharged from the head tends to increase. The use of an appropriate amount of surfactant may improve permeability to fabrics and may increase contact with a pretreatment composition, in some cases. Among the nonionic surfactants, when using a surfactant having an HLB value of 18 or more and 20 or less, preferably 10 or more and 18 or less, more preferably and 12 or more and 16 or less, it is possible to further stabilize discharge characteristics in the ink jet method.

1.1.3.3. pH Adjuster

In the first ink of the present embodiment, a pH adjuster can be added for the purpose of adjusting the pH. The pH adjuster is not particularly limited, and examples thereof include an appropriate combination of an acid, a base, a weak acid, and a weak base. Examples of the acid and the base used for the combination are as follows. Examples of an inorganic acid include sulfuric acid, hydrochloric acid, and nitric acid. Examples of an inorganic base include lithium hydroxide, sodium hydroxide, potassium hydroxide, potassium dihydrogenphosphate, disodium hydrogen phosphate, potassium carbonate, sodium carbonate, sodium hydrogen carbonate, and ammonia. Examples of an organic base include triethanolamine, diethanolamine, monoethanolamine, tripropanolamine, triisopropanolamine, diisopropanolamine, and trishydroxymethylaminomethane (THAM). As an organic acid, adipic acid, citric acid, succinic acid, lactic acid, N,N-bis (2-hydroxyethyl) -2-aminoethane-sulfonic acid (BES), 4-(2-hydroxyethyl) -1-piperazineethanesulfonic acid (HEPES), morpholinoethanesulfonic acid (MES), carbamoyl methyl iminobisacetic acid (ADA), piperazine-1,4-bis (2-ethanesulfonic acid) (PIPES), N-(2-acetamido) -2-aminoethanesulfonic acid (ACES), colamin hydrochloride, N-tris (hydroxymethyl) methyl-2-aminoethanesulfonic acid (TES), acetamidoglycine, tricine, glycinamide, good buffers such as bicine, phosphate buffer solution, citrate buffer solution, and tris buffer solution may be used. Further, among these, since it is possible to more stably obtain a pH buffering effect, it is preferable to contain a tertiary amine such as triethanolamine and triisopropanolamine and carboxyl group-containing organic acid such as adipic acid, citric acid, succinic acid, and lactic acid, as a part or all of the pH adjusters.

1.1.3.4. Water

The first ink according to the present embodiment may contain water. Examples of the water include pure water such as ion exchanged water, ultrafiltered water, reverse osmosis water, and distilled water and water obtained by removing ionic impurities as much as possible, such as ultrapure water. In addition, when using water sterilized by ultraviolet irradiation, addition of hydrogen peroxide, or the like, in a case where the first ink is preserved for a long time, it is possible to prevent bacteria and fungi from being generated.

A content of water is 30% by mass or more, preferably 40% by mass or more, more preferably 45% by mass or more, and further preferably 50% by mass or more, with respect to the total amount of the first ink. When referring to water in the first ink, for example, it is assumed that the water includes a coloring material dispersion used as a raw material and water to be added. When the content of the water is 30% by mass or more, it is possible to make the first ink to have relatively low viscosity. In addition, an upper limit of the content of water is preferably 90% by mass or less, more preferably 85% by mass or less, and further preferably 80% by mass or less, with respect to the total amount of the first ink.

1.1.3.5. Ureas

Ureas may be used as a moisturizing agent for the first ink or as a dyeing aid for improving a dyeing property of the dye. Specific examples of the ureas include urea, ethyleneurea, tetramethylurea, thiourea, 1,3-dimethyl-2-imidazolidinone. In a case of containing the ureas, a content thereof can be set as 1% by mass or more and 10% by mass or less, with respect to a total mass of the ink composition.

1.1.3.6. Saccharides

Saccharides may be used for the purpose of preventing the first ink from being solidified and dried. Specific examples of the saccharides include glucose, mannose, fructose, ribose, xylose, arabinose, galactose, aldonic acid, glucitol (sorbitol), maltose, cellobiose, lactose, sucrose, trehalose, and maltotriose.

1.1.3.7. Chelating Agent

A chelating agent may be used for the purpose of removing unnecessary ions in the first ink. Examples of the chelating agent include ethylenediamine tetraacetic acid and salts thereof (such as ethylenediaminetetraacetic acid dihydrogen disodium salt, nitrilotriacetic acid salt of ethylenediamine, hexametaphosphate, pyrophosphate, or metaphosphate).

1.1.3.8. Preservative and Mildew Proofing Agent

For the first ink, a preservative and a mildew proofing agent may be used. Examples of the preservative and the mildew proofing agent include sodium benzoate, sodium pentachlorophenol, 2-pyridinethiol-1-oxide sodium, sodium sorbate, sodium dehydroacetate, 1,2-dibenzoisothiazolin-3-one (Proxel CRL, Proxel BDN, Proxel GXL, Proxel XL.2, Proxel TN, and Proxel LV of AstraZeneca K.K.), and 4-chloro-3-methylphenol (such as Preventol CMK of Bayer Holding Ltd.).

1.1.3.9. Others

In addition to the above components, additives which can be generally used in an ink composition for an ink jet, such as a rust preventive, an antioxidant, an ultraviolet absorber, an oxygen absorber, and a dissolution aid may be contained.

1.1.4. Manufacturing First Ink and Physical Properties Thereof

The first ink according to the present embodiment can be obtained by mixing the above-described respective components in a certain order and, if desired, by filtration or the like to remove impurities. As a method of mixing the respective components, a method in which materials are sequentially added to a container including a stirring device such as a mechanical stirrer and a magnetic stirrer, and stirred and mixed is suitably used.

From the viewpoint of the balance between printing quality and reliability as an ink jet printing ink, in the first ink according to the present embodiment, a surface tension at 20° C. is preferably 20 to 40 mN/m, more preferably 25 to 38 mN/m, and further preferably 35 mN/m or less. The surface tension can be measured by confirming a surface tension when a platinum plate is wetted with a composition under an environment of 20° C., using an automatic surface tension meter CBVP-Z (manufactured by Kyowa Interface Science Co., LTD.).

In addition, from the same viewpoint, a viscosity of the first ink at 20° C. is preferably 1.5 to 10 mPa·s, and more preferably 2 to 8 mPa·s. In order to make the surface tension and the viscosity within the above range, the kind of the above-described water soluble organic solvent or the surfactant, and the amount thereof to be added, and the amount of water to be added may be appropriately adjusted. The viscosity can be measured by raising a shear rate to 10 to 1000 under an environment of 20° C. and reading the viscosity at the shear rate of 200, using a modular rheometer Physica MCR-300 (manufactured by Anton Paar GmbH).

1.2. Second Ink

The second ink included in the ink set according to the present embodiment develops a color of $|a^*|>10$ or $|b^*|>10$ in the CIELAB color space when it has dyed a white recording medium. That is, the second ink can dye the recording medium in a chromatic color. For example, 10 g/m² of printing is performed on the transfer paper with the second ink and the printed matter is transferred to the recording medium. As a result, the second ink develops a color of $|a^*|>10$ or $|b^*|>10$ in the CIELAB color space.

In the present specification, the color of $|a^*|>10$ or $|b^*|>10$ in the CIELAB color space may be referred to as a "high chroma color". In addition, in a case where the recording medium is dyed, an ink developing the color of $|a^*|>10$ or $|b^*|>10$ in the CIELAB color space may be referred to as a "high chroma color ink".

1.2.1. Second Disperse Dye

The second ink of the present embodiment contains a second disperse dye (hereinafter, also referred to as "second sublimation dye"). The second disperse dye is dispersed by the second dispersion resin. Specifically, the second disperse dye is the same as the first disperse dye described above. The second disperse dye is a dye suitably used for dyeing hydrophobic synthetic fibers formed of polyester, nylon, acetate, and the like, and is a compound that is insoluble or hardly soluble in water. In addition, the second disperse dye is a dye having a property of sublimation by heating. Specific examples of the second disperse dye used in the second ink of the present embodiment are one or more selected from the same disperse dyes as in the above-described first disperse dyes.

As the second disperse dye, a so-called composite containing plural kinds of disperse dyes may be used in a range capable of dyeing the recording medium to a chromatic color (high chroma color) with the second ink, and a single disperse dye may also be used. That is, the disperse dye may be used alone, or two or more kinds thereof may be used in combination (composite), for the purpose of obtaining a predetermined color tone or the like.

Specific examples of the second disperse dye include one or more selected from the same disperse dyes as in the above-described first disperse dyes, but it is preferable that the second ink contain, as the second disperse dye, one or more selected from C.I. disperse blue 60, C.I. disperse blue 87, C.I. disperse blue 165, C.I. disperse blue 359, C.I. disperse violet 28, C.I. solvent violet 13, C.I. disperse red 60, C.I. disperse red 154, C.I. disperse red 191, C.I. disperse red 277, C.I. disperse red 362, C.I. disperse red 364, C.I. solvent red 242, C.I. disperse orange 25, C.I. solvent orange 60, C.I. disperse yellow 54, C.I. disperse yellow 71, C.I. disperse yellow 82, C.I. disperse yellow 114, C.I. disperse yellow 163, C.I. disperse yellow 184, C.I. disperse yellow 232, C.I. solvent yellow 82, and C.I. solvent yellow 145.

It is possible to achieve a wider color reproduction range by the ink set of the present embodiment, by selecting the second disperse dye from these disperse dyes.

An average particle diameter of the second disperse dye is 30 nm or more and 300 nm or less, preferably 50 nm or more and 250 nm or less, and more preferably 50 nm or more and 200 nm or less, similarly to the first disperse dye. When the average particle diameter is within this range, sublimation efficiency is improved and a more favorable coloring property is obtained.

1.2.2. Second Dispersion Resin

The second ink of the present embodiment contains the second dispersion resin as a dispersant of the second disperse dye. The second dispersion resin has a function of dispersing (or emulsifying) the above-described second disperse dye in the second ink. The second dispersion resin can be selected similarly to the first dispersion resin described above. In addition, the second dispersion resin can be selected independently of the first dispersion resin described above.

Further, similarly to the first dispersion resin, it is more preferable that the total content of the second dispersion resin be formulated so that a mass ratio of the second dispersion resin to the second disperse dye (Sum of second dispersion resin/Sum of second disperse dye) is 20% or more and 200% or less. In addition, the mass ratio of the dispersion resin to the disperse dye is more preferably 30% or more and 150% or less, further preferably 40% or more and 100% or less, and particularly preferably 40% or more and 60% or less. According to this, the amount of the second dispersion resin with respect to the second disperse dye becomes favorable. Therefore, it is possible to further favorably disperse the second disperse dye.

1.2.3. Other Components

The second ink of the present embodiment includes other components, but both the selection of the kind and the mixing thereof are the same as those in the first ink described above. Thus, descriptions thereof will be omitted. In addition, a component of the second ink can be selected and mixed independently of the components of the first ink described above.

1.3. Relationship between First Dispersion Resin and Second Dispersion Resin 1.3.1. Glass Transition Temperature (Tg)

In the ink set of the present embodiment, the Tg of the first dispersion resin contained in the first ink and the Tg of the second dispersion resin contained in the second ink are selected to be different from each other. Some Glass Transition Temperatures Tg of commercially available dispersion resins will be described.

Nopcosperse 6100: Tg=80° C.
Joncryl 67: Tg=73° C.
Joncryl 586: Tg=60° C.
Joncryl 611: Tg=50° C.
Joncryl 678: Tg=85° C.
Joncryl 680: Tg=67° C.
Joncryl 682: Tg=56° C.
Joncryl 819: Tg=57° C.
X-200: Tg=83° C.
X-205: Tg=77° C.
X-220: Tg=71° C.
X-228: Tg=83° C.
Borchi (registered trademark) Gen 1350: Tg=20° C.
TEGO Disper 710: Tg=0° C.
ARON A6114: Tg=80° C.

The Tg of the dispersion resin can be obtained by, for example, thermal analysis of the solidified material.

When the first dispersion resin and the second dispersion resin respectively have different Tg, in a case where the first ink and the second ink are adhered closely to each other, the flowability of one ink decreases earlier than the other ink (changes from a rubber state to a glass state). Therefore, the first ink and the second ink are difficult to become mixed with each other. Accordingly, even in a case where both the first ink and the second ink are disposed close to each other on the recording medium, the inks are prevented from being mixed with each other (bleeding) and an image in which bleeding is prevented from occurring can be formed.

In addition, it is preferable that the Tg of the first dispersion resin be higher than the Tg of the second dispersion resin. The first ink of low chroma color containing the first dispersion resin is, for example, an ink of a color close to black. Therefore, in a case where the first ink and the second ink are adhered to the medium close to each other, bleeding at a boundary of an image in a case where the first ink penetrates (spreads) to a second ink side is more noticeable than in a case where the second ink penetrates to a first ink side. Therefore, by selecting a kind of resin so that the Tg of the first dispersion resin contained in the first ink of a color closer to the achromatic color is higher, it is possible to prevent penetration from the first ink side from occurring. That is, the flow of the first ink can be suppressed ahead of the flow of the second ink. Accordingly, even in a case where both inks are disposed close to each other on the recording medium, it is difficult for the first disperse dye to penetrate from a first ink side to a second ink side and it is possible to further prevent the bleeding of the image from occurring.

Further, it is more preferable that the Tg of the first dispersion resin be higher than the Tg of the second dispersion resin by 20° C. or more, preferably 25° C. or more, and further preferably 30° C. or more. According to this, the above effects are more likely to occur, and even in a case where the first ink and the second ink are disposed close to each other on the recording medium, it is further difficult for the first disperse dye to penetrate from the first ink side to the second ink side. Accordingly, it is possible to further prevent the bleeding of the image from occurring.

1.4. Molecular Structure of Dispersion Resin

In the ink set according to the present embodiment, it is more preferable that both the first dispersion resin and the second dispersion resin have an aromatic ring structure in their molecules. The first disperse dye and the second disperse dye respectively dispersed by the first dispersion resin and the second dispersion resin can be selected from the above-exemplified disperse dyes, but many of the disperse dyes have a tabular molecular structure.

The tabular molecular structure refers to a structure such as a benzene ring, a naphthalene ring, a porphyrin ring, and heterocyclic rings similar thereto, condensed rings, and the like, and when one molecule is viewed in a top view with a molecular model or the like, the structure is a planar flat structure. A molecule having this tabular molecular structure causes a plurality of molecules to overlap (stack), so that an aggregated structure is likely to be formed. Therefore, in a case where a disperse dye having a tabular molecular structure is selected as the first disperse dye or the second disperse dye, precipitates (foreign matters) are likely to be formed in the first ink or the second ink, the storage stability and the re-dispersibility of the ink decrease, and the discharge stability may deteriorate.

In this case, when a dispersion resin having an aromatic ring structure in the molecule is selected as the first dispersion resin and the second dispersion resin, an effect that the aromatic ring structure of the dispersion resin prevents the disperse dye molecules from stacking can be expected. According to this mechanism, even in a case where each of the first disperse dye and the second disperse dye has a structure that is easy to stack, it is still possible to prevent stacking from occurring. Accordingly, foreign matters can be prevented from occurring to further improve the storage stability and the re-dispersibility.

Some examples of the disperse dye having the tabular structure include, in addition to DB359: C.I. disperse blue 359, DY54: C.I. disperse yellow 54, DB360: C.I. disperse blue 360, DO25: C.I. disperse orange 25, and SO60: C.I. solvent orange 60, C.I. disperse blue 14, C.I. disperse blue 60, C.I. disperse blue 134, C.I. disperse blue 165, C.I. disperse blue 87, C.I. disperse red 92, C.I. disperse red 154, C.I. disperse red 191, C.I. disperse red 277, C.I. disperse red 362, C.I. disperse red 364, C.I. disperse yellow 71, C.I. disperse yellow 82, C.I. disperse yellow 114, C.I. disperse yellow 163, C.I. disperse yellow 184, C.I. disperse yellow 232, C.I. disperse violet 26, C.I. disperse violet 28, C.I. disperse orange 80, C.I. disperse brown 27, C.I. solvent blue 11, C.I. solvent blue 63, C.I. solvent blue 97, C.I. solvent blue 104, C.I. solvent blue 105, C.I. solvent red 242, C.I. solvent yellow 82, C.I. solvent yellow 145, and C.I. solvent violet 13.

In addition, some examples of the dispersion resin having the tabular structure include X-200, X-1, X-205, X-220, and X-228 (which are manufactured by SEIKO PMC CORPORATION), Nopcosperse 6100 and 6110 (which are manufactured by SAN NOPCO LIMITED), Joncryl 67, 586, 611, 678, 680, 682, and 819 (which are manufactured by BASF Corporation), Borchi (registered trademark) Gen 1350 (manufactured by 0MG Borschers), TEGO disperse 710 (manufactured by Evonik Tego Chemie GmbH), N-EA137, N-EA157, N-EA167, N-EA177, N-EA197D, N-EA207D, DKSD-N10, and DKSD-N14 (which are manufactured by DKS Co. Ltd), and N-504, N-506, N-509, N-516, N-568, N-707SN, N-710, N-714, N-714SN, N-723, N-740 (which are manufactured by Nippon Nyukazai Co., Ltd.).

1.5. Relationship between Physical Property Values of the First Ink and Second Ink In the ink set of the present embodiment, it is more preferable that the surface tension of the first ink be higher than the surface tension of the second ink. The surface tension of each ink can be adjusted by mixing. In this manner, bleeding on the recording medium is further prevented from occurring and a favorable image quality is easily obtained.

1.6. Operational Effects

According to the ink set of the present embodiment, the storage stability and re-dispersibility are excellent, and odor and bleeding of an image to be formed are prevented from occurring. That is, when the disperse dye is dispersed by the first dispersion resin and the second dispersion resin, the storage stability and the re-dispersibility are favorable and odor during heating can be prevented from occurring. Then, when the first dispersion resin and the second dispersion resin respectively have different Tg, the first ink and the second ink are difficult to become mixed with each other. Therefore, even in a case where both the first ink and the second ink are disposed close to each other on the recording medium, the inks are prevented from being mixed with each other (bleeding) and an image in which bleeding is prevented from occurring can be formed.

2. RECORDING METHOD

The ink set of the present embodiment can be suitably applied to a dyeing method (sublimation transfer ink jet recording method) for fabrics or the like, using sublimation transfer. The recording method of the present embodiment can also be referred to as a method for manufacturing a transfer source recorded material and/or a method for manufacturing a dyed material (dyed fabric). The recording method of the present embodiment uses the above-described ink set which is used for sublimation transfer and includes the first ink of $|a^*|≤10$ and $|b^*|≤10$ in the CIELAB color space and a second ink of $|a^*|>10$ or $|b^*|>10$ in the CIELAB color space. The recording method includes an attaching step of attaching the first ink or the second ink to the recording medium by an ink jet method and a heating step of heating the recording medium, after the attaching step.

As a dyeing method using the sublimation transfer, for example, there is a method in which printing is performed by an ink jet system using an ink composition containing a sublimation type dye in a sheet-like intermediate transfer medium (such as transfer paper) such as paper, and then the intermediate transfer medium is superimposed on the fabric or the like to perform the sublimation transfer by heating.

2.1. Attaching Step

In this step, the first ink and/or the second ink is discharged from the recording head to be adhered on a recording surface of the intermediate transfer medium (transfer paper), by the ink jet method. Discharge of the ink by the ink jet method can be performed using a droplet discharge apparatus (for example, an ink jet recording apparatus to be described later).

As the intermediate transfer medium (transfer paper), for example, paper such as plain paper, paper provided with an ink receiving layer (called exclusive paper for ink jet, coated paper, or the like), or the like can be used, and paper having an ink receiving layer formed of inorganic fine particles such as silica is more preferable. Accordingly, it is possible to obtain an intermediate recorded material in which bleeding or the like is prevented from occurring on the recording surface, in the process of drying the ink composition applied to the intermediate transfer medium. In addition, when using this medium, it is easy to further hold the disperse dye on the surface of the recording surface, and sublimation of the disperse dye can be performed more efficiently in a subsequent transfer step. In this step, plural kinds of the above-described first ink and/or the second ink may respectively be used.

2.2. Heating Step

The recording method of the present embodiment includes a heating step of heating the transfer paper after the attaching step. The heating step is a step of heating after the first ink and/or second ink to the transfer paper (intermediate transfer medium) is discharged. When the heating step is performed, drying of the ink adhered in the attaching step is accelerated to prevent the bleeding of the image from occurring, and an offset may be prevented from occurring, in some cases. The offset refers to a phenomenon in which a component of the ink moves relative to a back side in contact with the recording surface when the transfer paper is superimposed, for example, wound up by a roll or the like.

An ultimate temperature of the transfer paper in the heating step is preferably 60° C. or more, more preferably 70° C. or more and 120° C. or less, and further preferably 70° C. or more and 110° C. or less. When the ultimate temperature is within this range, it is difficult for the disperse dye to sublime and a favorable drying rate can be obtained.

2.3. Other Steps

The recording method of the present embodiment may further include a pre-heating step of heating at least one of the recording head and the transfer paper, in the attaching step. Further, the recording method of the present embodiment may further include a step of disposing a fabric on the recording surface of the transfer paper and a step of heating the transfer paper and the fabric.

The pre-heating step is, for example, a step of heating the recording head by radiant heat. According to the ink set according to the present embodiment, it is possible to prevent the nozzle from being clogged even in a case where the recording head is heated, and it is possible to secure discharge stability. A heating temperature when discharging the ink is, for example, preferably 30° C. to 60° C. and more preferably 40° C. to 60° C.

In the pre-heating step, the transfer paper may be heated. According to this, since the first ink and/or the second ink is adhered to the heated transfer paper, it becomes easy to dry promptly after the attaching, and it is possible to prevent the bleeding of an image and offset from occurring. A surface temperature of the transfer paper is, for example, preferably 30° C. to 60° C., more preferably 35° C. to 50° C., and further preferably 35° C. to 45° C.

The recording method of the present embodiment may include a step in which the recording surface of the intermediate transfer medium (transfer paper) to which the ink is applied is heated in a state in which the recording surface faces a material to be dyed (recording medium: fabric or the like) (in a state of disposing fabric or the like on the recording surface of the transfer paper), and the disperse dye contained in the first ink and/or the second transfer ink is transferred to the material to be dyed. Accordingly, a dyed material which is obtained by using the fabric or the like as a material to be dyed is obtained.

The heating temperature in the transfer step is not particularly limited, and is 160° C. or more and 220° C. or less, and preferably 170° C. or more and 200° C. or less. Accordingly, it is possible to apply sufficient energy to transfer the disperse dye to the material to be dyed, and it is possible to obtain excellent productivity of the dyed material.

Although the heating time in the transfer step depends on the heating temperature, the heating time is 30 seconds or longer and 90 seconds or shorter, and preferably 45 seconds or longer and 60 seconds or shorter. Accordingly, it is possible to obtain sufficient energy for transferring the disperse dye to the material to be dyed, and it is possible to obtain particularly excellent productivity of the dyed material.

In addition, although the transfer step may be performed by heating the intermediate transfer medium to which the first ink and/or the second ink in a state of facing with the material to be dyed, it is more preferable that the transfer step be performed by heating the intermediate transfer medium and the material to be dyed in a state of being closely contacted with each other. Accordingly, for example, it is possible to record (dye) a clearer image on the fabric or the like.

As the material to be dyed, for example, a sheet-like material such as a fabric (such as hydrophobic fiber fabric) and a resin (plastic) film is suitably used, and a material having a three-dimensional shape such as a spherical shape and a rectangular parallelepiped shape, other than the sheet-like shape, may also be used.

In addition, as the recording medium (material to be dyed), for example, glass, metal, or ceramic may be used in addition to the material made of resin or plastic. Examples of the fibers configuring the fabric as the material to be dyed include a polyester fiber, a nylon fiber, a triacetate fiber, a diacetate fiber, a polyamide fiber, and a mixed product using two or more of these fibers. In addition, a mixed product of these with recycled fibers such as rayon or natural fibers such as cotton, silk, wool, and the like may be used.

In addition, the resin (plastic) film as the material to be dyed include polyester film, polyurethane film, polycarbonate film, polyphenylene sulfide film, polyimide film, and polyamideimide film. The resin (plastic) film may be a laminate in which a plurality of layers are laminated, or may be a film formed of slope material in which composition of the material gradually changes.

It is more preferable that the recording medium (material to be dyed) used in the recording method of the present embodiment include polyester. Accordingly, it is possible to perform dyeing with further favorable coloring property using the first disperse dye and/or the second disperse dye contained in the first ink and/or the second ink.

According to this recording method, since the ink set of the present embodiment is used, bleeding in the transfer paper is prevented from occurring and drying property is favorable. For example, in a case where the dyed material is manufactured by transferring the disperse dye to, for example, fabric or the like, it is possible to easily obtain a result of less bleeding according to a design, and it is possible to easily prepare the transfer paper.

2.4 Configuration of Apparatus used for Recording Method

The ink set of the present embodiment can be suitably used for an ink jet recording apparatus. The ink jet recording apparatus is not particularly limited, as long as the apparatus includes at least an ink container (such as cartridge and tank) for containing the first ink and/or the second ink described above and a recording head connected to the ink container, and discharges the inks from the recording head to form an image on the intermediate transfer medium (such as transfer paper).

As the ink jet recording apparatus of the present embodiment, both a serial type and a line type can be used. A recording head is mounted on these types of ink jet recording apparatus. The ink jet recording apparatus can form a predetermined image by discharging liquid droplets of ink from nozzle holes of the recording head at a predetermined timing (intermittently) and with a predetermined volume (mass) while changing a relative positional relationship between the transfer paper and the recording head and attaching the ink to the transfer paper.

Here, in the serial type ink jet recording apparatus, the transporting direction of the recording medium (transfer paper) and the reciprocating direction of the recording head intersect each other in general, and a relative positional relationship between the recording medium and the recording head is changed by combining the reciprocating operation of the recording head and the transporting operation (also including reciprocating operation) of the recording medium. In this case, in general, a plurality of nozzle holes (holes for discharging ink composition) is disposed in the recording head, and rows (nozzle rows) of nozzle holes are formed along the transporting direction of the recording medium. In addition, in the recording head, a plurality of nozzle rows may be formed according to the kind and number of the ink, in some cases.

In general, in the line type ink jet recording apparatus, the recording head does not perform the reciprocating operation, and the relative positional relationship between the recording medium and the recording head is changed by changing the relative positional relationship between the recording medium and the recording head using transporting of the recording medium. Also in this case, in general, a plurality of nozzle holes are disposed in the recording head, and rows (nozzle rows) of the nozzle holes are formed along a direction intersecting the transporting direction of the recording medium.

For the ink jet recording type, a serial type or line type ink jet recording apparatus is used. However, the type is not particularly limited, as long as the type can cause liquid droplets to adhere to the recording medium by discharging the ink as the liquid droplets from fine nozzle holes. For example, as a droplet discharge type (a type of the ink jet method), a piezo type, a type of discharging ink by bubbles generated by heating the ink, or the like can be used. However, from the viewpoint that the ink composition is difficult to deteriorate or the like, the piezo type is preferable.

For the ink jet recording apparatus used in the present embodiment, for example, well-known configurations such as a heating unit, a drying unit, a roll unit, and a winding device can be adopted without limitation.

An example of a recording apparatus suitable for the recording method of the present embodiment will be described below. The figure shows a schematic sectional diagram of an ink jet recording apparatus according to an embodiment. As shown in the figure, the recording apparatus 1 includes a recording head 2, an IR heater 3, a platen heater 4, an after-heater 5, a cooling fan 6, a pre-heater 7, and a ventilation fan 8.

The recording head 2 discharges an ink jet ink composition to transfer paper. As the recording head 2, a type known in the related art can be used. Examples of the known type include a recording head that discharges liquid droplets by using vibration of a piezoelectric element, that is, a head that forms ink droplets by mechanical deformation of an electrostrictive element. The recording head 2 is, for example, capable of discharging dots of the ink jet ink composition from one nozzle in multiple sizes.

In the heating step, the transfer paper is heated after the attaching step, but in the recording apparatus 1, a step related thereto can be performed by the after-heater 5. Although not shown, units such as a warm air mechanism (not shown) and a constant temperature bath (not shown) may be used. The after-heater 5 heats and dries the transfer paper to which the ink jet ink composition is adhered. When the after-heater 5 heats the transfer paper on which the image is recorded, moisture and the like contained in the ink jet ink composition is evaporated and scattered more quickly. Accordingly, bleeding and the like is prevented from occurring. The after-heater 5 heats the transfer paper to preferably 70° C. or more, and further preferably 70° C. or more and 110° C. or less.

In the above-described pre-heating step, at least one of the recording head and the transfer paper is heated. However, in the recording apparatus 1, a step related thereto can be performed by an IR heater 3 which directly heats the recording head 2, or the platen heater 4 which heats the transfer paper and the recording head 2 via the transfer paper.

When using the IR heater 3, the transfer paper can also be heated from the recording head 2 side. Accordingly, the recording head 2 is easily heated at the same time, but it is possible to raise the temperature without being influenced by the thickness of the transfer paper, compared to a case of heating from a back side of the transfer paper, such as the platen heater 4. In addition, when using the platen heater 4, the transfer paper can be heated from the side opposite to the recording head 2 side. Accordingly, the recording head 2 is relatively less likely to be heated.

It is preferable that the recording apparatus 1 further include a transfer paper heating unit that heats the transfer paper such that the surface temperature thereof becomes approximately 30° C. to 60° C., when the ink is discharged to the transfer paper. The temperature is more preferably 35° C. to 50° C., and further preferably 35° C. to 45° C. The transfer paper heating unit is not particularly limited, but examples thereof include the IR heater 3 and the platen heater 4. When including the transfer paper heating unit, it is possible to more quickly dry the ink composition adhered to the transfer paper, and further prevent the bleeding of the image from occurring.

The "heating the transfer paper" refers to raising the temperature of the transfer paper to a desired temperature, and it is not limited to directly heating the transfer paper. The recording apparatus 1 may further include the cooling fan 6. After drying, when cooling the ink composition on the transfer paper by the cooling fan 6, there is a tendency to form a film with good adhesion on the transfer paper.

In addition, the recording apparatus 1 may further include the pre-heater 7 that heats in advance (preheats) the transfer paper before the ink composition is discharged to the transfer paper. Further, the recording apparatus 1 may further include the ventilation fan 8 so that the ink composition adhered to the transfer paper is more effectively dried.

2.5. Operational Effects

According to the recording method of the present embodiment, since the ink set described above is used, it is possible to create a favorable recorded matter with less bleeding and penetration. Further, since the above ink set is used, an appropriate recorded material can be formed even after each ink is stored.

3. EXAMPLES AND COMPARATIVE EXAMPLES

Hereinafter, aspects of the invention will be described more specifically with reference to Examples, but the invention is not limited to these Examples.

3.1. Preparation of Ink Jet Ink Composition

Each component was put into a container so as to have the composition shown in Table 1, mixed and stirred with a magnetic stirrer for 2 hours, and then filtrated with a membrane filter having a pore diameter of 5 μm to obtain first inks (low chroma color) and second inks (high chroma color) according to Examples and Comparative Examples. The first ink and second ink used in each example had the same composition except that the first ink and the second ink had different disperse dyes and dispersion resins. In addition, numerical values in Table 1 are based on % by mass.

TABLE 1

| | | % by mass | | | | | | | |
|---|---|---|---|---|---|---|---|---|---|
| | | Example 1 | | Example 2 | | Example 3 | | Example 4 | |
| | Kind of ink | Low chroma color | High chroma color | Low chroma color | High chroma color | Low chroma color | High chroma color | Low chroma color | High chroma color |
| Disperse dye | DB359 | — | 5.0 | — | 5.0 | — | 5.0 | — | 5.0 |
| | DY54 | 0.5 | — | 0.5 | — | 0.5 | — | 0.5 | — |
| | DB360 | 2.0 | — | 2.0 | — | 2.0 | — | 2.0 | — |
| | DO25 | 1.0 | — | 1.0 | — | 1.0 | — | 1.0 | — |
| | SO60 | 1.0 | — | 1.0 | — | 1.0 | — | 1.0 | — |
| Dispersion resin | Nopcosperse 6100 | 5.0 | — | 5.0 | — | 5.0 | — | — | 5.0 |
| | Joncryl 819 | — | 5.0 | — | — | — | — | 5.0 | — |
| | Borchi ® Gen 1350 | — | — | — | — | — | — | — | — |
| | TEGO Disper 710 | — | — | — | 5.0 | — | — | — | — |
| | ARON A6114 | — | — | — | — | — | 5.0 | — | — |
| Dispersant | Naphthalenesulfonic acid | — | — | — | — | — | — | — | — |
| Moisturizing agent | Propylene glycol | 5.0 | 5.0 | 5.0 | 5.0 | 5.0 | 5.0 | 5.0 | 5.0 |
| | Glycerin | 10.0 | 10.0 | 10.0 | 10.0 | 10.0 | 10.0 | 10.0 | 10.0 |
| Penetration solvent | Methyl triglycol | 5.0 | 5.0 | 5.0 | 5.0 | 5.0 | 5.0 | 5.0 | 5.0 |
| Surfactant | BYK348 | 0.5 | 0.5 | 0.5 | 0.5 | 0.5 | 0.5 | 0.5 | 0.5 |
| Water | Pure water | 70.0 | 69.5 | 70.0 | 69.5 | 70.0 | 69.5 | 70.0 | 69.5 |
| | Total | 100.0 | 100.0 | 100.0 | 100.0 | 100.0 | 100.0 | 100.0 | 100.0 |
| Evaluation | Hue a* | 1.5 | −6.2 | 1.5 | −7.4 | 1.5 | −6.3 | 1.48 | −5.5 |
| | Hue b* | −0.68 | −55.1 | −0.68 | −64.2 | −0.68 | −54.3 | −0.72 | −56.3 |
| | Odor | A | A | A | A | A | A | A | A |
| | Bleeding | A | | A | | B | | B | |
| | Storage stability | B | B | B | A | B | B− | B | B |
| | Clogging reliability (Re-dispersibility) | A | A | A | A | A | B− | A | A |

| | | % by mass | | | | | | | |
|---|---|---|---|---|---|---|---|---|---|
| | | Example 5 | | Example 6 | | Comparative Example 1 | | Comparative Example 2 | |
| | Kind of ink | Low chroma color | High chroma color | Low chroma color | High chroma color | Low chroma color | High chroma color | Low chroma color | High chroma color |
| Disperse dye | DB359 | — | 5.0 | — | 5.0 | — | 5.0 | — | 5.0 |
| | DY54 | 0.5 | — | 0.5 | — | 0.5 | — | 0.5 | — |
| | DB360 | 2.0 | — | 2.0 | — | 2.0 | — | 2.0 | — |
| | DO25 | 1.0 | — | 1.0 | — | 1.0 | — | 1.0 | — |
| | SO60 | 1.0 | — | 1.0 | — | 1.0 | — | 1.0 | — |
| Dispersion resin | Nopcosperse 6100 | — | 5.0 | — | — | 5.0 | 5.0 | — | — |
| | Joncryl 819 | — | — | — | — | — | — | — | — |
| | Borchi ® Gen 1350 | — | — | 5.0 | — | — | — | — | — |
| | TEGO Disper 710 | 5.0 | — | — | 5.0 | — | — | — | — |
| | ARON A6114 | — | — | — | — | — | — | — | — |
| Dispersant | Naphthalenesulfonic acid | — | — | — | — | — | — | 5.0 | 5.0 |
| Moisturizing agent | Propylene glycol | 5.0 | 5.0 | 5.0 | 5.0 | 5.0 | 5.0 | 5.0 | 5.0 |
| | Glycerin | 10.0 | 10.0 | 10.0 | 10.0 | 10.0 | 10.0 | 10.0 | 10.0 |
| Penetration solvent | Methyl triglycol | 5.0 | 5.0 | 5.0 | 5.0 | 5.0 | 5.0 | 5.0 | 5.0 |
| Surfactant | BYK348 | 0.5 | 0.5 | 0.5 | 0.5 | 0.5 | 0.5 | 0.5 | 0.5 |
| Water | Pure water | 70.0 | 69.5 | 70.0 | 69.5 | 70.0 | 69.5 | 70.0 | 69.5 |
| | Total | 100.0 | 100.0 | 100.0 | 100.0 | 100.0 | 100.0 | 100.0 | 100.0 |
| Evaluation | Hue a* | 1.39 | −5.5 | 1.41 | −7.4 | 1.5 | −5.5 | 1.42 | −6.7 |
| | Hue b* | −0.81 | −56.3 | −0.66 | −64.2 | −0.68 | −56.3 | −0.77 | −55.8 |
| | Odor | A | A | A | A | A | A | C | C |
| | Bleeding | B | | A | | C | | A | |
| | Storage stability | B | B | A | A | B | B | A | A |
| | Clogging reliability (Re-dispersibility) | B | B | B | B | A | A | A | A |

In Table 1, the components described except for the compound name are as follows.

DB359: C.I. disperse blue 359
DY54: C.I. disperse yellow 54
DB360: C.I. disperse blue 360
DO25: C.I. disperse orange 25
SO60: C.I. solvent orange 60
All these disperse dyes have a tabular structure.

Nopcosperse 6100 (manufactured by SAN NOPCO LIMITED: styrene based, Tg=80° C., having an aromatic ring structure)

Joncryl 819 (manufactured by BASF Corporation: styrene based, Tg=57° C., having an aromatic ring structure)

Borchi (registered trademark) Gen 1350 (manufactured by OMG Borschers: urethane based, Tg=20° C., having an aromatic ring structure)

TEGO Disperse 710 (manufactured by Evonik Tego Chemie GmbH: urethane based, Tg=0° C., having an aromatic ring structure)

Aron A6114 (manufactured by TOAGOSEI CO., LTD.: acryl based, Tg=80° C., having no aromatic ring structure)

3.2. Evaluation Method
3.2.1. Hue Evaluation

Using an ink jet printer (Sure Color SC-F7000, manufactured by Seiko Epson Corporation), ink of 10 g/m² at a resolution of 720×720 dpi was printed to a transfer paper which was an intermediate transfer medium (TRANSJET Classic, manufactured by Cham Paper Group), recording was performed, and a color chart was output using the ink set of each example.

Thereafter, an ink adhered side of the intermediate transfer medium was brought into close contact with a fabric (polyester 100%, Amina, manufactured by Toray Industries, Inc.) which was a white recording medium, and in this state, using a heat press machine (TP-60M, manufactured by Taiyo Seiki Co., Ltd.), heating was performed under conditions at 200° C. for 60 seconds, and sublimation transfer was performed to obtain each dyed material. An L* value, an a* value, and a b* value of the obtained reference color chart image were measured using a measuring machine (trade name "Xrite i1", manufactured by X-Rite). The obtained a* values and b* values were described in Table 1.

3.2.2. Odor Evaluation 10 ml of each ink of each example was put into a 50 ml of sample bottle, and the odor sensitivity evaluation was carried out. Evaluation was performed with reference to the following criteria, results thereof were shown in Table 1.

A: No odor at all
B: Odor is slightly felt
C: Odor 3.2.3. Evaluation of Bleeding In the evaluation of bleeding, an ink jet printer (trade name PX-G 930, manufactured by Seiko Epson Corporation) was filled with each ink, and recording was performed transfer paper (TRANSJET Sporrtline (manufactured by Chem Paper)). Specifically, a fill pattern capable of recording with a duty of 100% with a resolution of 720 dpi in a horizontal direction and 720 dpi in a longitudinal direction was prepared and used. Each solid color pattern was printed so as to be adjacent to each other, bleeding at the boundary portion was visually observed, evaluated in accordance with the following evaluation criteria, and the evaluation results were shown in Table 1. Since the first ink (low chroma color) and the second ink (high chroma color) of each example showed the same behavior in the bleeding, the columns for each example are summarized. This evaluation was performed in a laboratory under a condition of a room temperature (25° C.)

A: Bleeding at boundary portion was not confirmed.
B: Bleeding at boundary portion was slightly confirmed.
C: Bleeding at the boundary portion was considerably confirmed.

3.2.4. Ink Storage Stability

For each ink, changes in viscosity over time were examined and evaluated. Each ink was allowed to stand at 70° C. for 1 week, an initial viscosity and a viscosity after the standing were measured and evaluated in accordance with the following criteria, and the results were shown in Table 1. This evaluation was performed in a laboratory under a condition of a room temperature (20° C.).

A: Viscosity change within ±5%
B: Viscosity change within ±10%
B−: Viscosity change within ±15%
C: Viscosity change of ±15% or more 3.2.5. Clogging Reliability (Re-dispersibility)

An ink jet printer (trade name PX-G930, manufactured by Seiko Epson Corporation) was filled with each ink, and left for one month in a state of opening a cap. Thereafter, cleaning was performed three times, and it was determined that how many nozzles were clogged. Evaluation results are shown in Table 1. This evaluation was performed in a laboratory under a condition of a room temperature (25° C.)

A: No nozzle clogged
B: 1 to 5 nozzles clogged
B−: 6 to 20 nozzles clogged
C: 21 or more nozzles clogged 3.3. Evaluation Result In Examples using an ink set which includes the first ink (low chroma color) and the second ink (high chroma color) and in which the first ink contains the first disperse dye dispersed by the first dispersion resin, the second ink contains the second disperse dye dispersed by the second dispersion resin, the first dispersion resin and the second dispersion resin respectively have different Tg, all the evaluations had favorable results.

On the contrary, in Comparative Example 1 using an ink set in which the first dispersion resin and second dispersion resin have the same Tg (the same kind of resin), bleeding was poor. In addition, in Comparative Example 2, dispersant (naphthalenesulfonic acid) was used instead of dispersion resin, but the odor evaluation was poor.

The invention is not limited to the above embodiments, and various modifications can be made. For example, the invention includes substantially the same configurations as the configurations described in the embodiments (for example, configurations having the same functions, methods, and results, or configurations having the same purpose and effect). In addition, the invention includes a configuration in which a non-essential component of the configuration described in the embodiment is replaced. In addition, the invention includes a configuration exhibiting the same operational effect as the configuration described in the embodiment, or a configuration capable of achieving the same object. Also, the invention includes configurations in which well-known techniques are added to the configuration described in the embodiment.

The entire disclosure of Japanese Patent Application No. 2017-188510 filed Sep. 28, 2017 is expressly incorporated by reference herein.

What is claimed is:

1. An ink set which is used for sublimation transfer, comprising:
   a first ink having a color after transfer of |a*|≤10 and |b*|≤10 in a CIELAB color space, and containing a first disperse dye dispersed by a first dispersion resin; and
   a second ink having a color after transfer of |a*|>10 or |b*|>10 in the CIELAB color space, and containing a second disperse dye dispersed by a second dispersion resin,
   wherein the first dispersion resin has a first glass transition temperature, the second dispersion resin has a second glass transition temperature, and the first and second glass transition temperatures are different from each other.

2. The ink set according to claim 1, wherein the first glass transition temperature is higher than the second glass transition temperature.

3. The ink set according to claim 2, wherein the first glass transition temperature is at least 20° C. higher than the second glass transition temperature.

4. The ink set according to claim 1, wherein
   the first dispersion resin is one or more selected from acrylic resin, styrene resin, and urethane resin, and
   the second dispersion resin is one or more selected from acrylic resin, styrene resin, and urethane resin.

5. The ink set according to claim 4, wherein
   the first dispersion resin is one or more selected from styrene resin and urethane resin, and
   the second dispersion resin is one or more selected from styrene resin and urethane resin.

6. The ink set according to claim 1, wherein both of the first dispersion resin and the second dispersion resin have an aromatic ring structure.

7. The ink set according to claim 1, wherein the second ink contains, as the second disperse dye, one or more selected from C.I. disperse blue 60, C.I. disperse blue 87, C.I. disperse blue 165, C.I. disperse blue 359, C.I. disperse violet 28, C.I. solvent violet 13, C.I. disperse red 60, C.I. disperse red 154, C.I. disperse red 191, C.I. disperse red 277, C.I. disperse red 362, C.I. disperse red 364, C.I. solvent red 242, C.I. disperse orange 25, C.I. solvent orange 60, C.I. disperse yellow 54, C.I. disperse yellow 71, C.I. disperse yellow 82, C.I. disperse yellow 114, C.I. disperse yellow 163, C.I. disperse yellow 184, C.I. disperse yellow 232, C.I. solvent yellow 82, and C.I. solvent yellow 145.

8. The ink set according to claim 1, wherein the first ink contains C.I. disperse blue 360 as the first disperse dye.

9. The ink set according to claim 1, wherein either one or both of the first ink and the second ink further contain glycol ether.

10. A recording method using an ink set for sublimation transfer and includes a first ink and a second ink, the method comprising:
    applying the first ink and the second ink to a transfer paper by an ink jet method; and
    heating the transfer paper, after the application of the first ink and the second ink,
    wherein the first ink has a color after transfer of |a*|≤10 and |b*|≤10 in a CIELAB color space,
    the first ink contains a first disperse dye dispersed by a first dispersion resin,
    the second ink has a color after transfer of |a*|>10 or |b*|>10 in the CIELAB color space,
    the second ink contains a second disperse dye dispersed by a second dispersion resin, and
    the first dispersion resin has a first glass transition temperature, the second dispersion resin has a second glass transition temperature, and the first and second glass transition temperatures are different from each other.

11. The recording method according to claim 10, further comprising:
    additional heating of the transfer paper and a recording medium while the transfer paper and the recording medium are facing each other,
    wherein the recording medium contains polyester.

12. The ink set according to claim 10, wherein the first glass transition temperature is higher than the second glass transition temperature.

13. The ink set according to claim 12, wherein the first glass transition temperature is at least 20° C. higher than the second glass transition temperature.

14. The ink set according to claim 10, wherein
    the first dispersion resin is one or more selected from acrylic resin, styrene resin, and urethane resin, and
    the second dispersion resin is one or more selected from acrylic resin, styrene resin, and urethane resin.

15. The ink set according to claim 14, wherein
    the first dispersion resin is one or more selected from styrene resin and urethane resin, and
    the second dispersion resin is one or more selected from styrene resin and urethane resin.

16. The ink set according to claim 10, wherein both of the first dispersion resin and the second dispersion resin have an aromatic ring structure.

17. The ink set according to claim 10, wherein the second ink contains, as the second disperse dye, one or more selected from C.I. disperse blue 60, C.I. disperse blue 87, C.I. disperse blue 165, C.I. disperse blue 359, C.I. disperse violet 28, C.I. solvent violet 13, C.I. disperse red 60, C.I. disperse red 154, C.I. disperse red 191, C.I. disperse red 277, C.I. disperse red 362, C.I. disperse red 364, C.I. solvent red 242, C.I. disperse orange 25, C.I. solvent orange 60, C.I. disperse yellow 54, C.I. disperse yellow 71, C.I. disperse yellow 82, C.I. disperse yellow 114, C.I. disperse yellow 163, C.I. disperse yellow 184, C.I. disperse yellow 232, C.I. solvent yellow 82, and C.I. solvent yellow 145.

18. The ink set according to claim 10, wherein the first ink contains C.I. disperse blue 360 as the first disperse dye.

19. The ink set according to claim 10, wherein either one or both of the first ink and the second ink further contain glycol ether.

20. An ink set which is used for sublimation transfer, comprising:
    a first ink having a color after transfer of |a*|≤10 and |b*|≤10 in a CIELAB color space, and containing a first disperse dye dispersed by a first dispersion resin; and
    a second ink having a color after transfer of |a*|>10 or |b*|>10 in the CIELAB color space, and containing a second disperse dye dispersed by a second dispersion resin,
    wherein the first dispersion resin has a first glass transition temperature, the second dispersion resin has a second glass transition temperature, and the first glass transition temperature is at least 20° C. higher than the second glass transition temperature,
    wherein the first dispersion resin is one or more selected from styrene resin and urethane resin, and the second dispersion resin is one or more selected from styrene resin and urethane resin, and both of the first dispersion resin and the second dispersion resin have an aromatic ring structure.

\* \* \* \* \*